United States Patent

Schaefer

Patent Number: 4,712,903
Date of Patent: Dec. 15, 1987

[54] METHOD AND CIRCUIT ARRANGEMENT FOR THE AUTOMATIC DETERMINATION OF AN EXPOSURE VALUE

[75] Inventor: Klaus-Dieter Schaefer, Braunfels, Fed. Rep. of Germany

[73] Assignee: Ernst Leitz Wetzlar GmbH, Wetzlar, Fed. Rep. of Germany

[21] Appl. No.: 936,763

[22] Filed: Dec. 2, 1986

[30] Foreign Application Priority Data

Dec. 2, 1985 [DE] Fed. Rep. of Germany ....... 3542511

[51] Int. Cl.$^4$ .............................................. G03B 7/08
[52] U.S. Cl. ................................... 354/433; 354/425; 354/459; 354/460
[58] Field of Search ............... 354/425, 428, 429, 431, 354/433, 434, 456, 459, 460

[56] References Cited

U.S. PATENT DOCUMENTS

| | | | |
|---|---|---|---|
| 4,289,389 | 9/1981 | Kobori et al. | 354/429 |
| 4,349,255 | 9/1982 | Takayama | 354/429 |
| 4,391,500 | 7/1983 | Tsunekawa | 354/433 |
| 4,453,811 | 6/1984 | Yamasaki | 354/434 |
| 4,455,069 | 6/1984 | Kawamura | 354/434 |
| 4,456,353 | 6/1984 | Mizokami | 354/431 |
| 4,480,902 | 11/1984 | Kawamura | 354/434 |
| 4,492,858 | 1/1985 | Mizokami | 354/425 |

*Primary Examiner*—Russell E. Adams
*Attorney, Agent, or Firm*—Schwartz, Jeffery, Schwaab, Mack, Blumenthal & Evans

[57] ABSTRACT

A method and a circuit arrangement for photographic cameras for automatic determination of the exposure value by means of electrical signals obtained from integrated and selective brightness measurements of the object to be exposed. A difference value is formed, for the exposure control, in a manner which is known per se, from the comparison of an electrical signal value derived from the selective metering with an electrical signal value generated from the integrated metering. A correction value is determined from the comparison of the difference value with a threshold value. The correction value is set off against the electrical signal value generated from the integrated metering, and the value resulting from the setoff is used for exposure control of the camera.

10 Claims, 1 Drawing Figure

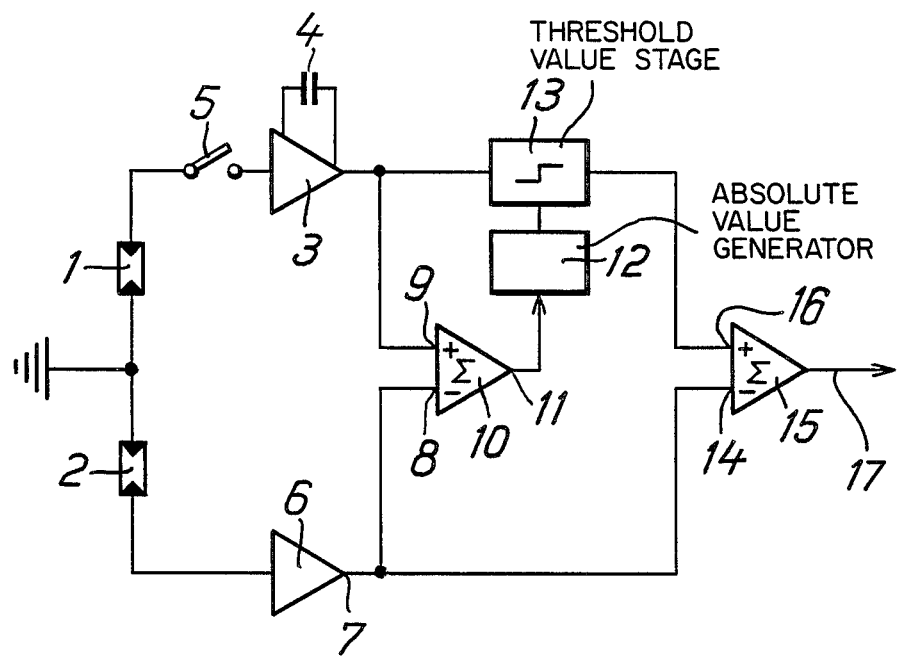

METHOD AND CIRCUIT ARRANGEMENT FOR THE AUTOMATIC DETERMINATION OF AN EXPOSURE VALUE

BACKGROUND OF THE INVENTION

The invention relates to a method and an arrangement for the automatic determination of an exposure value by means of electrical signals obtained from integrated and selective brightness measurement of the object to be exposed, for the exposure control in photographic cameras.

In general, the exposure metering in photographic cameras can be classified, according to the sensitivity characteristic towards the incident light, as integrated exposure metering, center-weighted exposure metering (or integrated metering with weighting of the central region) and as spot exposure metering. These types of exposure metering are advantageous in one respect and have disadvantages in others. Particularly when photographing a person in backlighting, for example, before a background of the sea or a snow-covered mountain, the main subject, namely the person, is greatly underexposed when integrated exposure metering or center-weighted exposure metering is used. In contrast, the exposure is essentially correct for such a photograph when spot exposure metering is used, but peripheral objects, which represent the background, are strongly overexposed. In each case, a photograph is obtained which is poorly balanced. To counteract this, Japanese Patent Application No. 26,229/1978 discloses that light values can be determined using spot exposure metering and integrated exposure metering with weighting of the picture center, a mean, which serves for exposure control, being derived if the difference between the two exceeds a pre-determined value.

In addition, German Offenlegungsschrift No. 2,838,227 discloses an exposure control device, for a camera, which meters the light passing through the aperture in order to generate a light metering output signal. The device also has a memory for storage of this output signal. The exposure is controlled by means of a light metering output signal in such a fashion that ideal exposure control with respect to a particular point within an object is placed in the photographic image plane.

The disadvantage of both exposure metering control systems is that the operation of the corresponding camera is made considerably more difficult, since the object elements used for the exposure metering do not necessarily lie in the image center. Thus, the object elements must first be metered and the pertinent measured values must be adopted and "stored" by pressing a button. To accomplish this requires the added fundamental switchover between "integrated" and "selective" exposure metering, which overall also complicates the design of the camera. Moreover, additional switches and displays are necessary, besides the appropriate metering buttons.

SUMMARY OF THE INVENTION

The object of the present invention is therefore to remedy these faults and to specify a method and a circuit arrangement for the automatic determination of an exposure value in a photographic camera whereby the handling of the camera is significantly simplified.

For a method of the type mentioned initially, this object is achieved in that (a) as is per se known, a difference value is formed from the comparison of an electrical signal value derived from the selective metering with an electrical signal value generated from the integrated metering, (b) a correction value is determined from the comparison of this difference value with a threshold value, (c) this correction value is setoff against the electrical signal value generated from the integrated metering, and (d) the value resulting from this setoff is used for exposure control of the camera.

The circuit arrangement according to the invention for carrying out the method has a differentiator, which compares the electrical signal generated from the integrated metering with the electrical signal derived from the selective metering, and is connected downstream of the integrally or selectively metering photoelectric converter elements. A threshold value stage is provided which forms a threshold value from the electrical signal value of the selective metering and a pre-specified electrical value and to which the output signal of the differentiator is applied. A setoff circuit is provided with inputs connected to the output of the threshold value stage or to the output of the integrally metering photoelectric converter element and the output of which is connected to the exposure control circuit of the camera.

BRIEF DESCRIPTION OF THE DRAWING

The single FIGURE is a schematic representation of the circuit arrangement for carrying out the method according to the present invention.

DETAILED DESCRIPTION OF THE PREFERRED EMBODIMENTS

An illustrative embodiment of the invention is described below in greater detail with reference to the schematic representation shown in the FIGURE.

In the circuit arrangement, it is proposed that a photographic camera, not represented, possesses a light metering detector comprising photoelectric converters 1, 2. Of these, the converter 1 is essentially only subjected to the light from a central region of the image field (="spot" or "selective" field) and the converter 2 is essentially only subjected to light from the outer region of the image field (="full" or "integral" field).

An amplifier 3 having a sample and hold circuit 4, with which the electrical signal generated by the photoelectric converter 1 due to the action of light is amplified, logarithmically compressed and temperature compensated, and also stored after actuation of a memory button 5. Memory button 5 is located between the photoelectric converter 1 and the amplifier 3.

The electrical signal generated by the photoelectric converter 2 from the "integral" region is fed to an amplifier circuit 6, where it is subjected, in a known fashion, to logarithmic compression and temperature compensation, besides preamplification.

The output 7 of the amplifier circuit 6 is connected to the input 8 of a differentiator 10. The other input 9 of the differentiator 10 is connected to the output of the amplifier 3 combined with the sample and hold circuit 4. Via the inputs 8,9, the differentiator 10 receives the electrical signal generated by the photoelectric converter 2 from the "integral" region and also the signal generated by the photoelectric converter 1 from the "selective" or "spot" region. Both signals are compared with one another in the differentiator 10. At the output 11 of the differentiator 10, a signal value is then produced which is fed to a threshold value stage 13 via an absolute value generator 12.

The threshold value in the threshold value stage 13 is formed from the signal value generated from the "selective" region and stored in the combination of amplifier 3 and sample and hold circuit 4 and from a pre-specified value, which may represent, for example, one to two exposure values.

If the signal value output by the differentiator 10 is smaller than that formed in each case in the threshold value stage 13, only the signal value generated from the "integral" region, which is available at the output 7 of the amplifier circuit 6, reaches the input 14 of a setoff circuit 15. From setoff circuit 15, the signal value is fed to the exposure control circuit, not represented, of the camera as indicated by reference numberal 17.

If, in contrast, the signal value produced by the differentiator 10 is greater than that formed in each case in the threshold value stage 13, then the setoff circuit 15 also receives, via an input 16, the signal value arising from the difference between the respective threshold value and the differentiator output. This signal value is then used for correction of the electrical signal value generated from the "integral" region.

The advantage of the application according to the invention is that it is possible firstly to meter specific "highlights" or "shadows" in the image field, to store the "selective" measured value, for example by only partial pressure on the camera shutter release, to point the camera at the actual object (the "mean" exposure of which is subsequently determined) and to automatically correct the effective exposure value corresponding to the stored "peak light/shadow" value.

What is claimed is:

1. A method for the automatic determination of an exposure value for the exposure control in a photographic camera, comprising the steps of:
   (a) generating electrical signals from an integrated brightness measurement of an object to be exposed;
   (b) generating electrical signals from a selective brightness measurement of the object;
   (c) comparing the integrated brightness electrical signal with the selective brightness electrical signal to generate a difference value;
   (d) comparing the difference value with a threshold value to generate a correction value; and
   (e) comparing the correction value with the integrated brightness electrical signal to generate an exposure value.

2. A method as claimed in claim 1, further including the step of storing the selective brightness electrical signal.

3. A method as claimed in claim 2, further including the step of generating the threshold value from the stored selective brightness electrical signal and a pre-specified electrical value.

4. A method as claimed in claim 1, wherein said step of comparing as recited in step (d) further includes the step of discriminating between
   (1) a first state, wherein the difference value is less than the threshold value, and
   (2) a second state, wherein the difference value is greater than the threshold value, wherein the first and second states are indicative of the correction value.

5. A circuit arrangement for the automatic determination of an exposure value for the exposure control in a photographic camera, comprising:
   means for generating electrical signals from an integrated brightness measurement of an object to be exposed;
   means for generating electrical signals from a selective brightness measurement of the object;
   means for comparing the integrated brightness electrical signal with the selective brightness electrical signal to generate a difference value;
   means for comparing the difference value with a threshold value to generate a correction value; and
   means for comparing the correction value with the integrated brightness electrical signal to generate an exposure value.

6. A circuit arrangement as claimed in claim 5, further including means for storing the selective brightness electrical signal.

7. A circuit arrangement as claimed in claim 6, further including means for generating the threshold value from the stored selective brightness electrical signal and a pre-specified electrical value.

8. A circuit arrangement as claimed in claim 5, wherein said means for generating the integrated brightness electrical signal is a first photoelectric converter and said means for generating the selective brightness electrical signal is a second photoelectric converter.

9. A circuit arrangement as claimed in claim 5, wherein said means for comparing the difference value with a threshold value further includes a means for discriminating between
   (1) a first state, wherein the difference value is less than the threshold value, and
   (2) a second state, wherein the difference value is greater than the threshold value, wherein the first and second states are indicative of the correction value.

10. A circuit arrangement as claimed in claim 6, wherein said means for storing comprises a storage circuit coupled to a shutter release button of the camera wherein said storage circuit is activated by at least partial pressure on the shutter release button.

* * * * *